J. J. GREENOUGH.
APPARATUS FOR ACTUATING BORING, CUTTING AND POLISHING TOOLS.
No. 185,860. Patented Jan. 2, 1877.
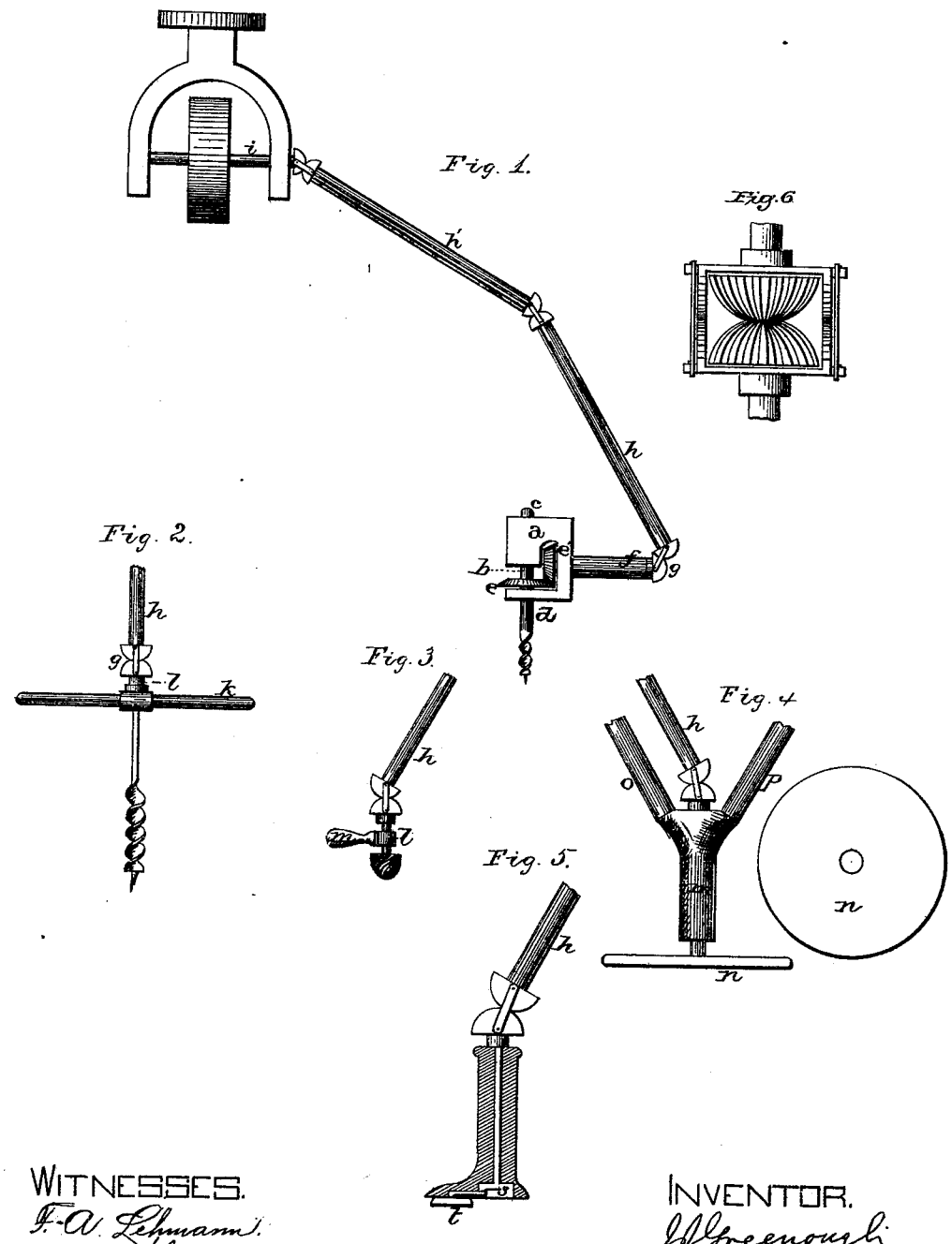
WITNESSES.
F. A. Lehmann
Wm. Hale
INVENTOR.
J. J. Greenough

UNITED STATES PATENT OFFICE.

JOHN J. GREENOUGH, OF SYRACUSE, NEW YORK.

IMPROVEMENT IN APPARATUS FOR ACTUATING BORING, CUTTING, AND POLISHING TOOLS.

Specification forming part of Letters Patent No. 185,860, dated January 2, 1877; application filed October 1, 1873.

*To all whom it may concern:*

Be it known that I, J. J. GREENOUGH, of Syracuse, New York, have invented certain improvements in driving boring-tools for wood and other materials, a part of which is also applicable to other tools, of which the following is a specification:

In the various mechanical works a want has been unsupplied for a power-driven tool turned by positive motion, that could be readily placed, and actuated in any position, so as to work either upward, downward, or at any angle required, and revolved with equal facility while guided by the hand of the operator or by machinery.

The nature of my invention is the supplying a toothed gear-connection, which has a strength and range of motion impracticable in practice, with a coiled spring, or like joint, and which drives the tool with a positive power unattainable with belting.

In the drawing, Figure 1 is a boring or drill head. Fig. 2 is an auger for boring. Figs. 3, 4, and 5 are other devices for wood-working, &c. Fig. 6 represents a toothed gear-joint at right angles to that shown in Fig. 1.

In the drawing I have shown the universal joint heretofore patented by me, and which I prefer, although I do not intend to confine myself to that, but may use bevel-gear therefor in some cases.

The tool, Fig. 1, consists of a suitable casting, $a$, in which there is a spindle, $b$, that forms a nut for the feed-screw $c$. The socket or chuck $d$ for the tool is turned by a bevel-wheel, $e$, gearing into another bevel-wheel, $e'$, on a short shaft, $f$, which is coupled with a universal joint at $g$ to a line-shaft, $h$, and this is coupled to another line-shaft, $h'$, which in turn may be coupled in like manner to a third line-shaft, or to the driving-shaft $i$, as shown in the drawing.

Any number of joints of line-shafting may be used, and of any convenient length, to connect the working-tool with the driving-shaft, the last joint being connected with it, running in stationary boxes or hangers.

By thus connecting the tool with the driving-power a hole may be bored or an incision made in any possible direction that could be done by a hand-tool. The handle, when used to hold or direct the tool may be made in line with it, as in Fig. 3, or at right angles thereto, as in Fig. 2.

In the boring apparatus, &c., above described, I claim—

The combination of the tools herein described with the driving-power by means of a tooth-geared universal-joint sectional line-shaft, constructed and operating in manner substantially as shown and described.

J. J. GREENOUGH.

Witnesses:
E. GREENOUGH,
LAURENCE L. JONES.